Feb. 21, 1967  W. R. COFFMAN  3,304,733
VACUUM COOLING METHOD AND APPARATUS
Filed Oct. 22, 1965  2 Sheets-Sheet 1
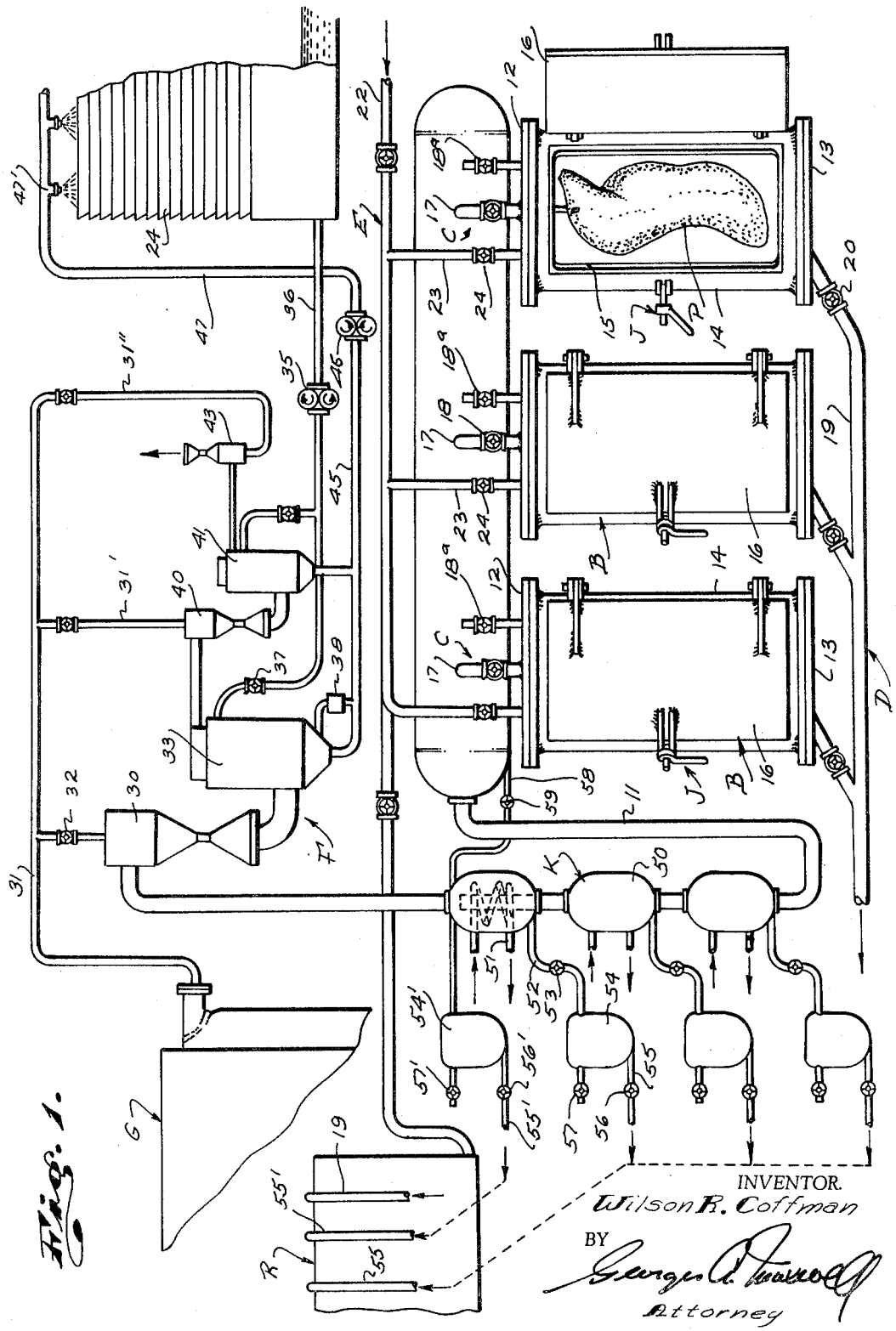
INVENTOR.
Wilson R. Coffman
BY
George A. Mrowoll
Attorney

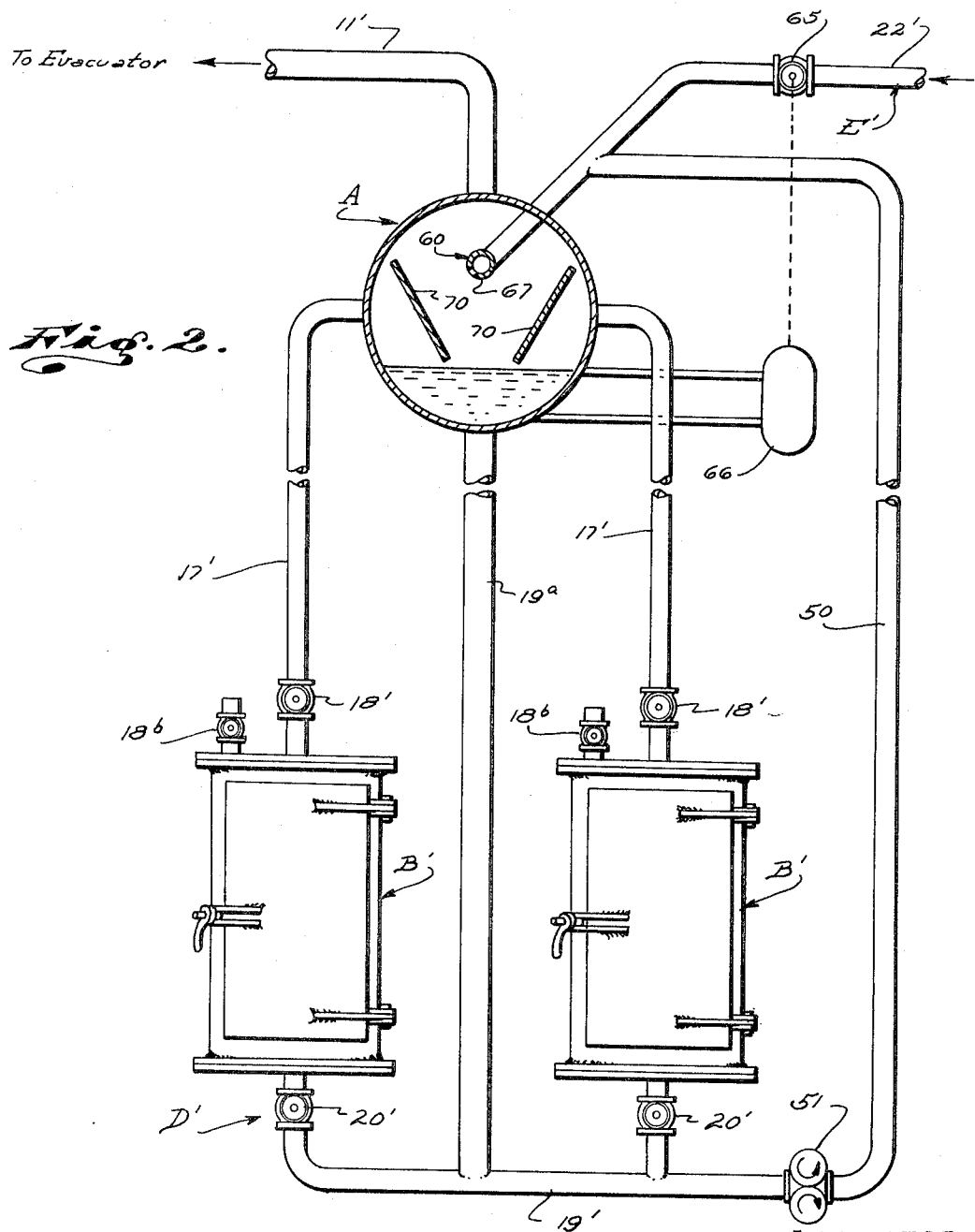

United States Patent Office 3,304,733
Patented Feb. 21, 1967

3,304,733
VACUUM COOLING METHOD AND
APPARATUS
Wilson R. Coffman, 2812 Newell St.,
Whittier, Calif. 90039
Filed Oct. 22, 1965, Ser. No. 500,570
16 Claims. (Cl. 62—100)

This invention relates to an improved method and apparatus for vacuum cooling food products and the like.

It is the primary object of my invention to provide a method of vacuum cooling wherein a minimum loss of weight of the food product cooled is experienced.

It is another object of this invention to provide a novel apparatus for carrying out my new method, which is rapid and economical.

Still another object of this invention is to provide means in conjunction with the vacuum cooling apparatus for collecting values such as volatile oils and other materials or matter ordinarily lost and wasted in carrying out vacuum cooling methods and reconstituting the products being cooled with said values.

In the art of vacuum cooling a reduction in the temperature is accomplished by reducing the atmospheric pressure in a closed chamber, in which the product to be cooled is arranged, and so that the water and other fluids in the chamber and in the product will boil, evaporate or otherwise expand into gaseous form. The function of expansion requires heat energy and results in a transfer of heat from the water or material vaporizing into the gas generated. The gas generated, with the heat, is constantly removed from the chamber as it is generated so as to continue the cooling operation. The cooling operation is continued until such time as the temperature of the product in the chamber is lowered to the desired temperature.

While the art of vacuum cooling has met with considerable success in cooling or chilling certain food products, it is nevertheless wanting in several respects.

The greatest short-coming in the present methods of vacuum cooling food products is the loss in weight of the products, as the result of dehydration. Subjecting the food products to sub-atmospheric pressures tends to draw off the natural moisture and fluids therefrom, which moisture and/or fluids vaporize and are exhausted from the chamber.

Attempts have been made to overcome or reduce this dehydration and loss of weight by injecting or providing water in the vacuum chamber to boil off or vaporize, with the idea in mind that by providing a ready supply of water to vaporize, the water will vaporize to lower the temperature in the chamber, before the natural moisture in the product will be vaporized. This attempt was effective to a limited extent in that a desired lower temperature could be established in a vacuum chamber more rapidly and without robbing the product of all of that water or fluid necessary to establish that temperature.

Subsequent attempts to inhibit dehydration of food products in vacuum cooling chambers have included supersaturating the atmosphere in the chambers with water. The idea here being that if the atmosphere had or contained all the moisture it would hold, it will not draw moisture from the food product.

While the above and similar ideas, when put into practice, have had some, though limited effect, they do not take into account and in no way effect the natural dehydration of food products which takes place as a result of lowering the temperature of the products by reducing the pressure.

In the case of cooling meat, for example, a side of beef, it is an accepted, general rule of thumb that a loss of about one percent of the weight of the meat, for each 10° F. reduction in temperature, will take place and as a result of dehydration, whether the meat is cooled in a chilling room at atmospheric pressure or in a vacuum chamber.

In cases where the meat is chilled in a vacuum chamber, a greater loss is experienced due to the fact that the moisture is drawn from the meat by the vacuum or minus pressure to which it is subjected.

While the above is true, applicant has found that if meat cooled or chilled by vacuum is submerged in water or other suitable fluid before the vacuum is released, the excess moisture drawn therefrom and a portion of the moisture lost as a result of the natural dehydration will be absorbed by the meat with the result that the total loss of weight is considerably less than 1% for each 10° F. in reduction of temperature obtained.

It is imperative, however, that the water or fluid in which the meat is submerged, before the vacuum is released, be chilled to the same low temperature of the meat, otherwise the meat will draw in or absorb warm water and the entire operation will be rendered ineffective.

Further, it is imperative that the vacuum in the chamber be maintained during the flooding operation and that it be released only when the meat is fully submerged, whereupon the atmosphere or natural pressure acting on the body of fluid urges the fluid back into the meat. It is to be noted that this does not inject or force water or fluid back into the meat, but rather, subjects the meat to a condition where it is free and capable of absorbing and taking back in the major portion of its natural moisture content.

Accordingly, it is an object of my invention to provide a method of vacuum cooling the food product which includes submerging the product in a chilled fluid prior to releasing the vacuum or to the minus pressure to which it has been subjected.

An object of this invention is to provide a method of the character referred to wherein the fluid in which the product is submerged is or contains natural juices, esters and other like values of the product which is being cooled.

An object of my invention is to provide a novel apparatus for carrying out my new method which is easy and economical to manufacture, maintain and service.

Further, it is an object of my invention to provide a novel apparatus for effectively and efficiently cooling products in batches, substantially continuously.

It is a further object of my invention to provide a method for cooling or chilling meat, as set forth above, wherein the meat is submerged in a suitable marinade fluid prior to releasing the vacuum thereon, whereby the meat is flavored and/or tenderized as desired.

Other objects and features of my invention will be recognized and understood from the following detailed description of my invention throughout which description reference is made to the accompanying drawings, in which:

FIG. 1 is a diagrammatic view of a typical preferred carrying out of the invention; and FIG. 2 is a diagrammatic view of a portion of another form of my invention.

The apparatus that I provide and which is diagrammatically illustrated in the accompanying drawing includes an elongated vacuum log or accumulator A, a plurality of separate or individual product receiver tanks or vacuum chambers B connected with the accumulator A and under control of suitable valve means C, valve control drain means D relate to the receiver tanks or chambers B, fluid supply means E related to said chambers B, and multi-stage steam jet evacuating means F connected with the accumulator and adapted to draw and maintain a sub-atmospheric pressure therein, which pressure approaches a vacuum and will hereinafter be referred to as a vacuum.

In addition to the foregoing, the apparatus includes a steam generating means G to provide steam under pressure for the evacuating means F and a multi-stage condensing means H for condensing and separating certain predetermined values or materials from the vapors generated in and exhausted from the chambers, for subsequent reintroduction into the chambers and the product therein.

The accumulator A is a simple, elongate, horizontally disposed pressure tank, established as to withstand atmospheric pressure from without, when a vacuum is established within.

The accumulator A is provided with an exhaust port fitting 10 at one end, which fitting connects with an exhaust duct 11 extending to the means F.

The receiver tanks or vacuum chambers B are simple elongate vertically disposed tank-like structures having top and bottom walls 12 and 13 and cylindrical side walls 14. The side walls 14 are provided with access openings 15. Suitable doors or closures 16, adapted to be selectively shifted into and out of engagement over the openings 15 are pivotally carried by the side walls 14. Suitable sealing means I and latch means J are provided to seal between the closures 16 and the side walls 14 and to releasably hold the closures in closed position.

The several tanks or chambers B are connected with the accumulator A by means of vacuum pipes 17 extending between the accumulator and the top wall of each chamber and establishing communication therebetween.

The valve means C serves to control the flow of air into out of the chamber B. This is, to control the flow of atmosphere from the several chambers B into the accumulator and the flow of atmosphere back into the chambers. The means C includes simple, manually or automatically operable valves 18 in the pipes 17 to control flow from the chambers into the accumulator and manually or automatically operable valves 18ª at the tops of the chambers to control the flow of atmosphere into the chambers.

With the apparatus thus far described, it will be apparent that upon establishing the vacuum in the accumulator A, each of the several chambers B can be loaded or charged with a desired product and closed or sealed, whereupon the valve C related thereto can be actuated or opened so as to establish a vacuum in the chamber. It will also be apparent that the valve means C related to each chamber can be closed and the chamber opened to remove the product therefrom, when necessary or desired.

The drain means D that I provide includes a drain pipe 19, with a manually or automatically operable valve 20 therein, connected with the bottom of each chamber B and extending to and connected with a common main 21. The main 21 can extend to a sewer or the like, if it is not desired to salvage or keep the liquid introduced into the chamber by the means E, or to a suitable reservoir R if it is desired to recirculate the liquid, as will hereinafter be described.

The fluid supply means E is adapted to selectively introduce fluid into the chambers B, as circumstances require. The means E shown as including a fluid supply main 22 extending from a suitable fluid supply, such as a water main or the reservoir R, a branch line 23 extending between the supply main 22 and the top 12 of each chamber B and manually operable valve 24 in each branch line.

With the means E set forth above, it will be apparent that each chamber B can be flooded with fluid whenever required and the fluid thus introduced into the chambers can be advantageously removed or drained therefrom by operation of the means D.

The multi-stage steam jet evacuating means F includes a primary ejector 30 supplied with steam by line 31 and control valve 32. The line 31 extends from the steam generating means G, which steam generating means can be a high pressure boiler of any suitable or desired design and construction.

A first or primary condenser 33 is connected with the discharge end of the ejector 30. The condenser is supplied with moving water from the cooling tower 24, which water is moved through a line 36 extending from the tower to the condenser by means of a pump 35. A suitable control valve 37 is provided in line 36 to control the flow of fluid in accordance with the water level in the bottom of the condenser. In practice, the valves 37 can be operatively related to a suitable float control 38, as diagrammatically illustrated.

A secondary ejector 40 is provided to receive vapor from the top of the primary condenser 33. The ejector 40 receives steam through a valve branch line 31' and discharges it into a second condenser 41. A third ejector 43 supplied with steam through a valved control line 31" is connected with the top of the secondary condenser 41 and discharges into atmosphere.

Condensate from the second condenser may be discharged by line 44 and mixed with the condensate from the first or primary condenser, which condensate is discharged through line 45 extending from a condenser 33 to a pump 46, which pump delivers the condensate, under pressure through line 47 and sprinkler heads 47' into the top of the water or cooling tower 24.

With the means as set forth above, it will be apparent that a vacuum can be drawn and maintained continuously in the accumulator A.

It is to be understood that the means F could, if so desired, be in the form of a mechanical pump or the like without departing from the spirit of the invention, and that the steam jet means illustrated and described above is only typical of one preferred carrying out of the invention.

The condensing means H that I provide includes a plurality of condensers K arranged in series in the exhaust duct 11 extending from the accumulator A to the means F.

Each condenser K is adapted to condense and thereby separate certain values or materials in the vapor flowing from the product placed in the chambers B, into the accumulator A and thence through the duct 11, towards the means F.

In the form of the invention illustrated, each condenser K includes a tank 50 to receive the vapor, a heat transfer coil 51 conducting a coolant at a predetermined temperature and extending through the tank, a transfer line 52 with a manually operable control valve 53 therein and extending from the bottom of the tank 50 to a trap tank 54 and adapted to conduct condensate from the tank 50 into the tank 54, a drain line 55 with a normally closed control valve 56 extending from the bottom of the tank 54 to the reservoir R, or to another station for disposal or use, as desired. A normally closed vacuum release valve 57 is provided at the upper end of the tank 54.

With the means H set forth above, it will be apparent that a condenser K can be provided for each heat range required to condense those desired materials or values in the vapor drawn from the product in the chambers B and through the accumulator A. It will be further apparent that by intermittently closing the valves 53, next opening the valves 57 and finally opening the valves 56, the tanks 54 can be drained and the condensate removed therefrom for subsequent desired use, without putting the apparatus out of operation.

In practice and as illustrated in the drawings, a drain line 58, with a normally closed valve 59 can be provided at the bottom of the accumulator A to drain condensate that may collect therein. The line 58 can connect with a trap tank 54' having a drain line 55' extending to the reservoir R, if desired, and under control of a normally closed vacuum release valve 57'.

When the apparatus is in use, the means F is set into operation and a vacuum is drawn and established in the accumulator A.

The valves 18 are closed and the closure 16 of the chambers B are opened.

A load of product P, to be cooled or chilled, is arranged in one of the chambers B and the closure 16 thereof is closed and locked in sealed position.

With the product thus arranged and with the chamber B closed, the normally closed valve 18 related to the chamber is opened and the vacuum is immediately drawn and maintained in the chamber.

As the vacuum is drawn into the chamber, any water or moisture therein expands and vaporizes, which expansion or vaporization causes a reduction in temperature.

It will be noted that establishing and maintaining the maximum possible minus pressure or vacuum, is very important as the lower the pressure, the more vapor and proportionately greater cooling effect is generated for a given volume of water or moisture. Accordingly, if a relatively high pressure is maintained, a greater volume of fluid or moisture will be required and a greater amount of dehydration of the product will result than if an extremely low minus pressure is established and maintained.

By providing a vacuum accumulator, having many times the volume of any one chamber, it will be apparent that each chamber is effectively and immediately evacuated of all atmosphere and the vacuum therein is maintained constant, as soon as the valve 18 therein is opened.

It will be apparent that as the moisture in the product and chamber is vaporized and cooling of the product is continued, the vapor or gases must be continuously evacuated therefrom.

After the product has been in the chamber and subjected to the vacuum a predetermined and sufficient length of time to lower the temperature of the product to the desired extent, the valve 24 of the fluid supply means is opened and fluid is introduced into the chamber at a rate so that a sufficient portion of the fluid thus introduced, vaporizes to cool or chill the remainder of the fluid so introduced and the chilled remainder of the fluid drops to the bottom of the chamber and eventually fills said chamber. This introduction of fluid into the chamber is continued until the product is completely submerged.

It is extremely important to note that in order to accomplish the above, the liquid must be introduced into the chamber at the top thereof and permitted to rain or drop down to the bottom and to fill the chamber.

If fluid was introduced into the chamber at the bottom thereof, only the surface of the body of fluid would boil or vaporize and thereby become chilled. The remainder of the fluid, that is, the subsurface fluid would remain at ambient temperature. Further, to pre-chill the water and introduce it at the bottom of the chamber would be an added and costly step which would render the entire process too costly and impractical.

When sufficient fluid has been introduced into the chamber B to completely submerge the product therein, the valve 18 is closed and vacuum release valve 18ª is opened and air is drawn into the chamber to break the vacuum and neutralize the pressure therein with ambient atmospheric pressure.

Releasing or breaking the vacuum in the chamber and the resulting application of ambient atmospheric pressure on the liquid and product within the chamber allows or permits the product to absorb or otherwise take back a volume of the liquid close to the volume of the liquid or moisture which was given up by the product, due to the exposure of the product to sub-atmospheric pressures and due to the lowering of its temperature.

After the vacuum has been broken as set forth above, and after the product has been permitted to soak in the chilled fluid a sufficient period of time to absorb a volume of fluid approximating its natural or normal moisture content, the valves 20 of the drain means D is opened and the fluid is drained from the chamber.

When the chamber is drained, the closure 16 is opened and the product is removed.

It will be noted that by loading and unloading the several chambers B in sequential order, the apparatus is such that it can be operated substantially continuously and in such a manner as to handle a continuous production of products. For example, in a packing house where a head of beef is slaughtered every two minutes and where a side or half of beef is properly chilled by my method and apparatus in thirty minutes, an apparatus as provided by this invention having thirty chambers will handle the entire production of the packing house without requiring it to be shut down and without requiring the slaughtering department to stop or slow up production.

Further, it will be apparent that the chambers B can be established of limited size or volume to receive a batch of products of predetermined volume or size and so that the volumetric area to be evacuated of atmosphere and to be filled with fluid is maintained at a minimum thereby materially enhancing the efficiency of the apparatus.

As the moisture of the product vaporizes in the chamber, the vapor is drawn therefrom into the accumulator A and thence through the exhaust duct 11 into and through the means F.

The condensing means H, as pointed out above, separates and collects those values desired to be saved and delivers them into the reservoir R from which the means E draws its supply of fluid.

In practice, the condensed and collected values can be supplemented with distilled, hygienically pure, bacteria-free water or otherwise treated and made acceptable for the treatment of and introduction into the product.

If the distillates are substituted out, or not used to treat the product, they can be used for other purposes and need not be wasted.

If desired, the fluid may have certain other additives, such as fruit juices, with active enzymes therein to tenderize and/or flavor the product.

It will be apparent that the entire system of my apparatus can be advantageously closed and can be made of suitable material and of a suitable desgin so as to be hygienically clean and such that the invention can be practiced in accordance with sanitation and public health laws and regulations under which food processors must operate.

In the second form of the invention illustrated in FIGURE 2 of the drawings, the water, liquid or solution is recirculated through the apparatus in such a manner as to maintain a constant supply of killed liquid and to materially reduce the amount of vapor loss otherwise experienced in vacuum cooling systems.

In the form of the invention now under consideration, the accumulator A' is arranged above the chambers B' and is adapted to receive and hold a volume of liquid for effectively cooling and for flooding the several chambers.

The drain or flooding pipes 19' of the drain means D', connected with the bottoms of the chambers B' and under control of the valves 20', extend to and communicate with the bottom of the accumulator A'.

With this relationship of parts, it will be apparent that when the valves 20' of the means D are opened, the fluid in the accumulator A is permitted to drain, by gravity, from the accumlator and into the chambers to flood the chambers and submerge the product arranged therein.

In practice, the several lines 19' connect with a single vertical line 19A which extends to and communicates with the bottom of the accumulator. The line 19A is preferably in excess of 32 feet in height and establishes a barometric leg which serves to maintain a vacuum in the accumulator A'.

When the chambers B are flooded in the above manner and the product is ready to be removed, the valves 18' are closed and the vacuum release valves 18B, at the tops of the chambers, are opened. Opening the valves 18B releases the vacuum and permits the fluid to drain from the chambers. Since the line 19A is a barometric leg, the effect of the sub-atmospheric pressure in the accumulator will not draw the fluid from the chambers. Accordingly, I provide a bypass line 50 between the lines 19' at the bottoms of the chambers and the top of the accumulator and a pump 51 in the line 50 to pump the fluid drawn from the chambers up and back into the accumulator.

The pump 51 is in contant operation and in such that when no chamber is being purged of liquid, it recirculates the fluid in the accumulator and the line 19A, as will hereinafter be described.

When the chambers are purged of liquid, the valves 20' are closed and the closures 16' are open, providing access to the product in the chambers.

The fluid supply means E' in this second form of the invention is related to the means D' and includes a water distributor means 60 in the accumulator A'. The distributor means includes an elongate distributor tube 61 in the upper portion of the accumulator, above the fluid level therein. The tube 61 is provided with a plurality of longitudinally spaced apertures or nozzle openings and serve to spray or sprinkle the fluid introduced into the chamber into the upper portion thereof.

The distributor means 60 is constantly supplied with recirculated fluid flowing through the line 50 and moved by the pump 51. The means 61 is intermittently supplied with fresh makeup fluid by the means E', which means involves a water supply line 22' extending from a suitable water supply, a valve 65 in the line 22 and a float control means 66 at the lower portion of the accumulator A'. The float control means 66 is operatively related to the valve 65 and is adapted to open and close the valve 65 to maintain a constant predetermined fluid level in the accumulator.

The line 17' extending between the top of the chambers B' and the accumulator A' and in which the valves 18' are arranged, communicate with the accumulator above the fluid level therein.

Suitable baffle plates 70 are arranged in the accumulator between the ports communicating with the lines 17' and the distributor tube 61 so that fluid is not distributed directly into the lines 17'. The plates 70 also serve as condenser plates.

In operation, a portion of the liquid or fluid introduced into the accumulator vaporizes and is evacuated through the line 11' extending to the evacuating means. In the drawings, I have not illustrated the evacuating means. It is to be understood that, in practice, the evacuating means employed in this second form of the invention can be the same as that employed in the first form of the invention and which is illustrated in FIGURE 1 of the drawings.

That portion of the liquid which does not vaporize is killed and dropped to the bottom of the accumulator. Some of the liquid may freeze and turn to frost and become deposited on the walls of the accumulator and the condensing or baffle plates 70. This frost is subsequently melted and washed down and into the body of liquid in the bottom of the accumulator by subsequently introduced fluid.

It will be apparent from the above that the liquid in the accumulator is suitably chilled and as a result can be introduced into the lower ends of the chamber as set forth above. It need not be sprayed into the chambers and allowed to fall and vaporize therein, in order to chill it.

It will also be apparent that the recirculated fluid is chilled and as such is less subject to vaporizing than fluid at ambient temperature, since the extent to which a liquid vaporizes when subjected to sub-atmospheric pressures is directly related or proportionate to the difference in temperature between the supply fluid and the temperature to which the fluid is to be brought.

By materially reducing the amount of vaporization in the manner set forth above, the work required to be performed by the evacuating means is reduced in direct proportion thereto. Accordingly, with my second form of the invention, less power or energy is required to operate the apparatus and carry out the method.

Having described only typical preferred forms and applications of my invention, I do not wish to be limited to the specific details herein set forth, but wish to reserve to myself any modifications and/or variations that may appear to those skilled in the art and which fall within the scope of the following claims.

Having described my invention I claim:

1. An apparatus of the character referred to including, a vacuum accumulator tank, a vacuum line connected with and extending from the accumulator tank, evacuating means connected with the vacuum line and operable to establish and maintain a subatmospheric pressure in the accumulator tank, a vertically disposed product receiving tank, an exhaust line extending between the accumulator tank and the top of the receiver tank, a control valve in the exhaust line to selectively establish and shut off flow therethrough, a vacuum release valve in the top of the tank to selectively establish and shut off communication between the interior of the product tank and the ambient atmosphere, valve control supply means connected with and extending between a fluid source and the product tank and adapted to selectively introduce fluid into the product tank to submerge a vacuum chilled product therein and valve controlled drain means connected with the bottom of the product tank to drain fluid therefrom.

2. An apparatus of the character referred to including, a vacuum accumulator tank, a vacuum line communicating with and extending upwardly from the accumulator tank, evacuating means connected with the vacuum line and operable to establish and maintain a subatmospheric pressure in the accumulator tank, a plurality of vertically disposed product receiver tanks, an exhaust line extending between the accumulator tank and the top of each receiver tank, a control valve in each exhaust line to selectively establish and shut off flow therethrough, a vacuum release valve in the top of each receiver tank to selectively establish and shut off communication between the interior thereof and ambient atmosphere, valve control fluid supply means connected with and extending between a fluid source and each receiver tank and adapted to selectively introduce fluid into the receiver tank to submerge a vacuum chilled product therein and valve controlled drain means communicating with the bottom of each receiver tank to drain fluid therefrom.

3. An appanatus of the character referred to including, a vacuum accumulator tank, a vacuum line connected with and extending from the accumulator tank, evacuating means connected with the vacuum line and operable to establish and maintain a subatmospheric pressure in the accumulator tank, a vertically disposed product receiving tank, an exhaust line extending between the accumulator tank and the top of the receiver tank, a control valve in the exhaust line to selectively establish and shut off flow therethrough, a vacuum release valve in the top of the tank to selectively establish and shut off communication between the interior of the product tank and the ambient atmosphere, valve control supply means connected with and extending between a fluid source and the product tank and adapted to selectively introduce fluid into the product tank to submerge a vaccum chilled product therein and valve controlled drain means connected with the bottom of the product tank to drain fluid therefrom, and condenser means in the vacuum line between the accumulator and the evacuating means to condense and separate vaporized values issuing from the product and evacuated from and through the receiver and accumulator tanks and valve controlled means between the condenser means and the liquid supply means to selectively introduce the condensates from the condensing means into the fluid supply means.

4. An apparatus of the character referred to including, a vacuum accumulator tank, a vacuum line communicating with and extending upwardly from the accumulator tank, evacuating means connected with the vacuum line and operable to establish and maintain a subatmospheric pressure in the accumulator tank, a plurality of vertically disposed product receiver tanks, an exhaust line extending between the accumulator tank and the top of each receiver tank, a control valve in each exhaust line to selectively establish and shut off flow therethrough, a vacuum release valve in the top of each receiver tank to selectively establish and shut off communication between the interior thereof and ambient atmosphere, valve control fluid supply means connected with and extending between a fluid source and each receiver tank and adapted to selectively introduce fluid into the receiver tank to submerge a vacuum chilled product therein and valve controlled drain means communicating with the bottom of each receiver tank to drain fluid therefrom, and condenser means in the vacuum line between the accumulator tank and the evacuating means to condense and separate vaporized values issuing from the products and evacuated from and through the several tanks, and valve controlled means between the condenser means and the fluid supply means to selectively introduce the condensates into the fluid supply means.

5. An apparatus of the character referred to including, a vacuum accumulator tank, a vacuum line connected with and extending from the accumulator tank, evacuating means connected with the vacuum line and operable to establish and maintain a subatmospheric pressure in the accumulator tank, a vertically disposed product receiving tank, an exhaust line extending between the accumulator tank and the top of the receiver tank, a control valve in the exhaust line to selectively establish and shut off flow therethrough, a vacuum release valve in the top of the tank to selectively establish and shut off communication between the interior of the product tank and the ambient atmosphere, valve control supply means connected with and extending between a fluid source and the product tank and adapted to selectively introduce fluid into the product tank to submerge a vacuum chilled product therein and valve controlled drain means connected with the bottom of the product tank to drain fluid therefrom, said fluid supply means including a fluid supply main connected with the top of the receiver tank and a control valve in the main to selectively establish and shut off the flow of fluid therethrough and into the receiver tank.

6. An apparatus of the character referred to including, a vacuum accumulator tank, a vacuum line communicating with and extending upwardly from the accumulator tank, evacuating means connected with the vacuum line and operable to establish and maintain a subatmospheric pressure in the accumulator tank, a plurality of vertically disposed product receiver tanks, an exhaust line extending between the accumulator tank and the top of each receiver tank, a control valve in each exhaust line to selectively establish and shut off flow therethrough, a vacuum release valve in the top of each receiver tank to selectively establish and shut off communication between the interior thereof and ambient atmosphere, valve control fluid supply means connected with and extending between a fluid source and each receiver tank and adapted to selectively introduce fluid into the receiver tank to submerge a vacuum chilled product therein and valve controlled drain means communicating with the bottom of each receiver tank to drain fluid therefrom, said liquid supply means including a fluid supply main, a branch line extending between the top of each tank and the main and a control valve in each branch line to selectively establish and shut off the flow of fluid through the branch line and into its related receiver tank.

7. An apparatus of the character referred to including, a vacuum accumulator tank, a vacuum line connected with and extending from the accumulator tank, evacuating means connected with the vacuum line and operable to establish and maintain a subatmospheric pressure in the accumulator tank, a vertically disposed product receiving tank, an exhaust line extending between the accumulator tank and the top of the receiver tank, a control valve in the exhaust line to selectively establish and shut off flow therethrough, a vacuum release valve in the top of the tank to selectively establish and shut off communication between the interior of the product tank and the ambient atmosphere, valve control supply means connected with and extending between a fluid source and the product tank and adapted to selectively introduce fluid into the product tank to submerge a vacuum chilled product therein and valve controlled drain means connected with the bottom of the product tank to drain fluid therefrom, and condenser means in the vacuum line between the accumulator and the evacuating means to condense and separate vaporized values issuing from the product and evacuated from and through the receiver and accumulator tanks and valve controlled means between the condenser means and the liquid supply means to selectively introduce the condensates from the condensing means into the fluid supply means, said liquid supply means including a fluid supply main, a branch line extending between the top of each tank and the main and a control valve in each branch line to selectively establish and shut off the flow of fluid therethrough and into the interior of the receiver tank.

8. An apparatus of the character referred to including, a vacuum accumulator tank, a vacuum line communicating with and extending upwardly from the accumulator tank, evacuating means connected with the vacuum line and operable to establish and maintain a subatmospheric pressure in the accumulator tank, a plurality of vertically disposed product receiver tanks, an exhaust line extending between the accumulator tank and the top of each receiver tank, a control valve in each exhaust line to selectively establish and shut off flow therethrough, a vacuum release valve in the top of each receiver tank to selectively establish and shut off communication between the interior thereof and ambient atmosphere, valve control fluid supply means connected with and extending between a fluid source and each receiver tank and adapted to selectively introduce fluid into the receiver tank to submerge a vacuum chilled product therein and valve controlled drain means communicating with the bottom of each receiver tank to drain fluid therefrom, and condenser means in the vacuum line between the accumulator tank and the evacuating means to condense and separate vaporized values issuing from the products and evacuated from and through the several tanks, and valve controlled means between the condenser means and the fluid supply means to selectively introduce the condensates into the fluid supply means, said liquid supply means including a fluid supply main, a branch line extending between the top of each tank and the main and a control valve in each branch line to selectively establish and shut off the flow of fluid therethrough and into the interior of its related receiver tank.

9. An apparatus of the character referred to including, a vacuum accumulator tank, a vacuum line connected with and extending from the accumulator tank, evacuating means connected with the vacuum line and operable to establish and maintain a subatmospheric pressure in the accumulator tank, a vertically disposed product receiving tank, an exhaust line extending between the accumulator tank and the top of the receiver tank, a control valve in the exhaust line to selectively establish and shut off flow therethrough, a vacuum release valve in the top of the tank to selectively establish and shut off communication between the interior of the product tank and the ambient atmosphere, valve control supply means connected with and extending between a fluid source and the product tank and adapted to selectively introduce fluid into the product tank to submerge a vacuum chilled product therein and valve controlled drain means connected with the bottom of the product tank to drain fluid therefrom, said drain means including a drain pipe connected with the bottom of the receiver tank and a control valve in the drain pipe to selectively establish and shut off flow through the drain pipe, said fluid supply means including a barometric leg stand pipe connected with and depending from the bottom of the accumulator tank and connected with the drain pipe, a return line extending from the bottom of the stand pipe to the top of the accumulator tank, a fluid distributor in the top of the accumulator tank and connected with the return line, a recirculating pump in the return line to draw fluid from the bottom of the accumulator and the stand pipe and deliver it to the distributor.

10. An apparatus of the character referred to including, a vacuum accumulator tank, a vacuum line communicating with and extending upwardly from the accumulator tank, evacuating means connected with the vacuum line and operable to establish and maintain a subatmospheric pressure in the accumulator tank, a plurality of vertically disposed product receiver tanks, an exhaust line extending between the accumulator tank and the top of each receiver tank, a control valve in each exhaust line to selectively establish and shut off flow therethrough, a vacuum release valve in the top of each receiver tank to selectively establish and shut off communication between the interior thereof and ambient atmosphere, valve control fluid supply means connected with and extending between a fluid source and each receiver tank and adapted to selectively introduce fluid into the receiver tank to submerge a vacuum chilled product therein and valve controlled drain means communicating with the bottom of each receiver tank to drain fluid therefrom, said drain means including a drain pipe connected with the bottom of each tank and a control valve in each drain pipe to selectively establish and shut off the flow of fluid therethrough, said fluid supply means including a barometric leg stand pipe connected with and depending from the bottom of the accumulator tank and connected with the drain pipes, a return line extending from the bottom of the stand pipe to the top of the accumulator tank, a fluid distributor in the top of the accumulator tank and connected with the return line, a recirculating pump in the return line to draw fluid from the bottom of the accumulator tank and the stand pipe and deliver it to the distributor.

11. An apparatus of the character referred to including, a vacuum accumulator tank, a vacuum line connected with and extending from the accumulator tank, evacuating means connected with the vacuum line and operable to establish and maintain a subatmospheric pressure in the accumulator tank, a vertically disposed product receiving tank, an exhaust line extending between the accumulator tank and the top of the receiver tank, a control valve in the exhaust line to selectively establish and shut off flow therethrough, a vacuum release valve in the top of the tank to selectively establish and shut off communication between the interior of the product tank and the ambient atmosphere, valve control supply means connected with and extending between a fluid source and the product tank and adapted to selectively introduce fluid into the product tank to submerge a vacuum chilled product therein and valve controlled drain means connected with the bottom of the product tank to drain fluid therefrom, and condenser means in the vacuum line between the accumulator and the evacuating means to condense and separate vaporized values issuing from the product and evacuated from and through the receiver and accumulator tanks and valve controlled means between the condenser means and the liquid supply means to selectively introduce the condensates from the condensing means into the fluid supply means, said drain means including a drain pipe connected with the bottom of each receiver tank and a control valve in each drain pipe to selectively establish and shut off the flow of fluid therethrough, said fluid supply means including a barometric leg stand pipe communicating with and depending from the bottom of the accumulator tank and connected with the drain pipes, a return line extending from the bottom of the stand pipe to the top of the accumulator tank, a fluid distributor in the top of the accumulator tank and connected with the return line, a recirculating pump in the return line to draw fluid from the bottom of the accumulator tank and the stand pipe and to deliver it to the distributor.

12. The method of vacuum cooling hydrate food products comprising; first, subjecting the product to be cooled to sub-atmospheric pressures to vaporize a portion of the water therein and to effect cooling the product; second, submerging the product in a body of chilled water while maintaining said sub-atmospheric pressure on the product and said body of water; third, subjecting said body of water and the product therein to atmospheric pressure to rehydrate the product and finally, removing the cooled hydrate food product from the body of water.

13. The method of vacuum cooling hydrate food products comprising; first, subjecting the product to be cooled to a vacuum to draw out and vaporize a portion of the water therein and to effect cooling the product; second, introducing water into the vacuum at a rate and in such volume that a portion thereof vaporizes and cools and the remainder surrounds the product; third, releasing said vacuum and subjecting the water and submerged product to atmospheric pressure and permitting the product to rehydrate; and fourth, removing the cooled hydrate product from the water.

14. The method of vacuum cooling hydrate food products having volatile values therein comprising; first, subjecting the product to be cooled to a sub-atmospheric pressure to vaporize a portion of the water and volatile values thereof and to effect cooling the product; second, condensing and collecting the vaporized values; third, mixing the condensed values with water and chilling the mixture; fourth, submerging the product in said chilled mixture while maintaining said sub-atmospheric pressures thereon; fifth, increasing said pressures to which the mixture and product is submerged to that of atmosphere and allowing the product to rehydrate therein; and finally, removing the product from the mixture.

15. The method and apparatus for cooling hydrate food products including, arranging the products to be cooled in a closed, vertically disposed chamber, exhausting the atmosphere therein to establish a vacuum whereby water in the product vaporizes and lowers the temperature of the product, next, introducing water into the chamber at the upper end thereof at a sufficient rate and volume so that a portion of the water vaporizes to cool the remainder of the water and so that said remainder of the water fills the chamber to submerge the product, next releasing the vacuum and permitting the product to absorb water and rehydrate, then draining the water from the chamber and finally, opening the chamber and removing the product therefrom.

16. The method and apparatus for cooling hydrate food products having volatile values including, arranging the product to be cooled in a closed, vertically disposed chamber, exhausting the atmosphere therein to establish a vacuum whereby water and volatile values in the product are drawn therefrom and are vaporized and whereby the temperature of the product is lowered, simultaneously exhausting the vapors from the chamber and condensing and collecting them, next introducing the condensate and water into the chamber at the upper end thereof at a sufficient rate and volume so that a portion thereof vaporizes to cool the remainder and so said remainder fills the chamber to submerge the product, next releasing the vacuum and permitting the product to absorb the mixed water and condensates, next draining the water and condensates from the chamber and finally, removing the product from the chamber.

References Cited by the Examiner

UNITED STATES PATENTS

| | | | |
|---|---|---|---|
| 2,502,527 | 4/1950 | McFarlan | 62—100 |
| 2,651,184 | 9/1953 | Kasser | 62—268 |
| 2,787,141 | 4/1957 | Julius | 62—100 |
| 2,964,412 | 12/1960 | Morrison | 99—194 |

WILLIAM J. WYE, *Primary Examiner.*